Patented July 29, 1930

1,771,810

UNITED STATES PATENT OFFICE

EINAR MORTERUD, OF TORDEROD, NEAR MOSS, NORWAY

UTILIZATION OF WASTE STEAM FROM EVAPORATION APPARATUS IN PULP DIGESTING PLANTS

No Drawing. Application filed September 11, 1928, Serial No. 305,334, and in Norway November 28, 1927.

The economic utilization of the waste steam from evaporation devices co-operating with pulp digesting plants has been difficult owing to the lack of apparatuses which were able to continuously utilize the comparatively large quantities of low temperature heat which necessarily result from the economic operation of an evaporation plant.

The obvious use of the waste steam for heating drying cylinders cannot be carried out economically owing to the fact that the drying cylinders require a higher temperature than the temperature of the waste steam from an economically operated evaporation plant.

In accordance with the present invention the waste steam from the evaporation plants are utilized in connection with the intermittent pre-heating process in the several pulp digestors, and as an intermediate element between the continuously operating evaporation plant and the intermittent pre-heating process there is introduced a heat accumulator in the form of a large quantity of liquid, to which the condensation heat of the steam is transmitted, preferably by directly conducting the steam current into the said quantity of liquid.

The heat which is accumulated in this manner is again utilized to pre-heat the pulp of the several digestors by circulating the liquid of the heat accumulator through the digestors when the pre-heating of the same is to take place.

I claim:

A process for utilizing waste steam from continuously operating evaporation plants in connection with the digesting of pulp comprising accumulation of the condensation heat of the waste steam in a liquid and the utilization of said liquid for intermittently pre-heating the pulp in the digestors.

In testimony whereof I affix my signature.

EINAR MORTERUD.